United States Patent [19]

Hill et al.

[11] Patent Number: 4,885,497
[45] Date of Patent: Dec. 5, 1989

[54] WINDING FOR A PULSE POWER AC GENERATOR ROTOR

[75] Inventors: Robert A. Hill, Linthicum Heights, Md.; Dennis J. Scott, Jeannette, Pa.

[73] Assignee: Westinghouse Electric Corp., Pittsburgh, Pa.

[21] Appl. No.: 228,408

[22] Filed: Aug. 5, 1988

[51] Int. Cl.$^4$ .............................................. H02K 1/22
[52] U.S. Cl. ..................................... 310/265; 310/179; 310/203
[58] Field of Search ............... 310/179, 203, 208, 265; 307/106; 363/174; 372/82

[56] References Cited

PUBLICATIONS

"Pulsed Power Packs a Punch", Published in IEEE Spectrum, Mar. 1985, pp. 59–66.

Primary Examiner—Patrick R. Salce
Assistant Examiner—Judson H. Jones
Attorney, Agent, or Firm—D. Schron

[57] ABSTRACT

A winding for a rotor in a pulse power AC generator has an electrical conductor extending along a closed loop path about an exterior periphery and first and second opposite ends of the rotor core. The conductor includes at least four side conductor portions having first and second opposite ends, and at least four end conductor portions interconnecting the side conductor portions to complete the closed loop path. The side conductor portions extend generally parallel to one another along generally linear portions of the closed loop path and are disposed along and angularly displaced generally ninety electrical degrees from one another about the rotor core exterior periphery. A first pair of the end conductor portions are disposed at the first opposite ends of the side conductor portions along the first end of the rotor core and interconnect respective adjacent pairs of the side conductor portions. A second pair of the end conductor portions are disposed at the second opposite ends of the side conductor portions along the second end of the rotor core and interconnect respective opposite pairs of the side conductor portions. The end conductor portions of the first pair thereof extend along respective non-crossing back-to-back generally ninety electrical degree portions of the closed loop path, whereas the end conductor portions of the second pair thereof extend along respective generally linear portions of the closed loop path which cross one another in a generally orthogonal relation.

8 Claims, 3 Drawing Sheets

WINDING FOR A PULSE POWER AC GENERATOR ROTOR

BACKGROUND OF THE INVENTION

1. Field of the Invention

The present invention generally relates to pulse power generation and, more particularly, is concerned with a winding for a pulse power AC generator rotor.

2. Description of the Prior Art

Extremely high power pulses of electrical energy are needed for high energy lasers, inertial confinement lasers in fusion devices, electromagnetic launchers, particle accelerators, etc. To deliver this pulse power, energy must be collected at low power, stored, and then released almost instantaneously. These pulses are presently generated by capacitor banks, homopolar generators, explosive devices and rotating machines known as flux compressors or pulse generators. For a survey of these and other techniques for pulse power generation, attention is directed to an article entitled "Pulsed power packs a punch" published in IEEE Spectrum, March 1985, pages 59–66.

Many of these current pulse generation techniques have certain drawbacks. Capacitors are too large and expensive for most applications because the volume required for a unit of energy in a capacitor is approximately 10,000 times greater than that required in a magnetic device. Homopolar generators are in general use but can only generate pulses at low voltages. Also, they require the use of brushes to carry the tremendous currents required. Rotating flux compressors and pulse generators in use or in development require the use of brushes which is a severe limitation on the pulse power levels attainable. Brushes also restrict the use of the machines to certain atmospheric conditions conducive to good brush operation.

Consequently, a need still exists for an improved pulse power generation technique which avoids the drawbacks associated with prior techniques.

SUMMARY OF THE INVENTION

The present invention provides a pulse power generator rotor winding. The rotor winding of the present invention actively aids the storage of energy in the magnetic field of the generator during a charging phase of operation and actively aids the release of the stored magnetic and kinetic energy during the discharging phase of operation.

The rotor winding increases the maximum inductance by providing a positive feedback path that increases the flux linkages of a main stator winding during the charging phase. The rotor winding also minimizes the minimum inductance of the generator by generating a flux that opposes the flux linkage of the main stator winding during the discharging phase. The reduction of minimum inductance also allows the production of very short pulses. Since the rotor winding requires no brushes or external connections, it allows repetitious production of pulses.

Accordingly, the present invention is directed to a winding for use with a pulse power AC generator rotor. The winding comprises an electrical conductor extending along a closed loop path. The conductor includes at least four angularly-displaced side conductor portions having first and second opposite ends, and at least four end conductor portions interconnecting the four side conductor portions to complete the closed loop path of the conductor. A first pair of the four end conductor portions are disposed at the first opposite ends of the four side conductor portions and interconnect respective adjacent pairs of the four side conductor portions. A second pair of the four end conductor portions are disposed at the second opposite ends of the four side conductor portions and interconnect respective opposite pairs of the four side conductor portions.

More particularly, the four side conductor portions extend generally parallel to one another along generally linear portions of the closed loop path. Also, the four side conductor portions are disposed along and angularly displaced generally ninety degrees from one another about a common imaginary cylindrical surface.

The first and second pairs of the four end conductor portions are disposed along respective oppositely displaced parallelly-extending imaginary planar surfaces. The end conductor portions of the first pair thereof extend along respective non-crossing back-to-back generally ninety-degree portions of the closed lop path. The end conductor portions of the second pair thereof extend along respective generally linear portions of the closed loop path which cross one another in a generally orthogonal relation.

These and other advantages and attainments of the present invention will become apparent to those skilled in the art upon reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

In the following description, right and left hand references are determined by standing at the feed discharge end (or rear) of the apparatus and facing in the direction of the arrow in FIG. 1 (or toward the front of the apparatus). Also in the following description, it is to be understood that such terms as "forward", "left", "upwardly", etc., are words of convenience and are not to be construed as limiting terms.

Figure 1:
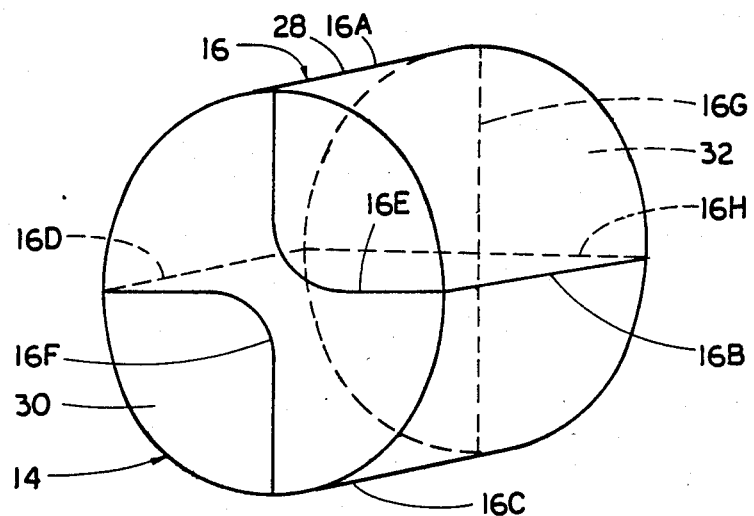
FIG. 1 is a schematic perspective view of a single conductor version of a winding for a pulse power AC generator rotor constructed in accordance with the principles of the present invention.
Figure 2:
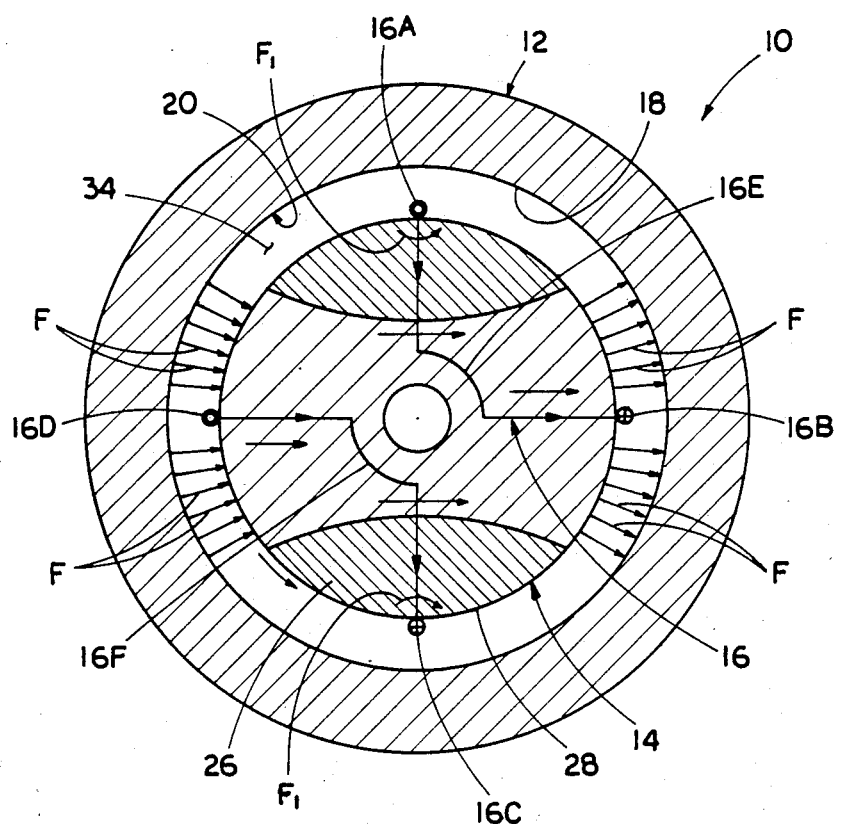
FIGS. 2 and 3 are schematic diagrams of the cross sections of a generalized pulse power AC generator during charging and discharging phases of its operation.
Figure 3:
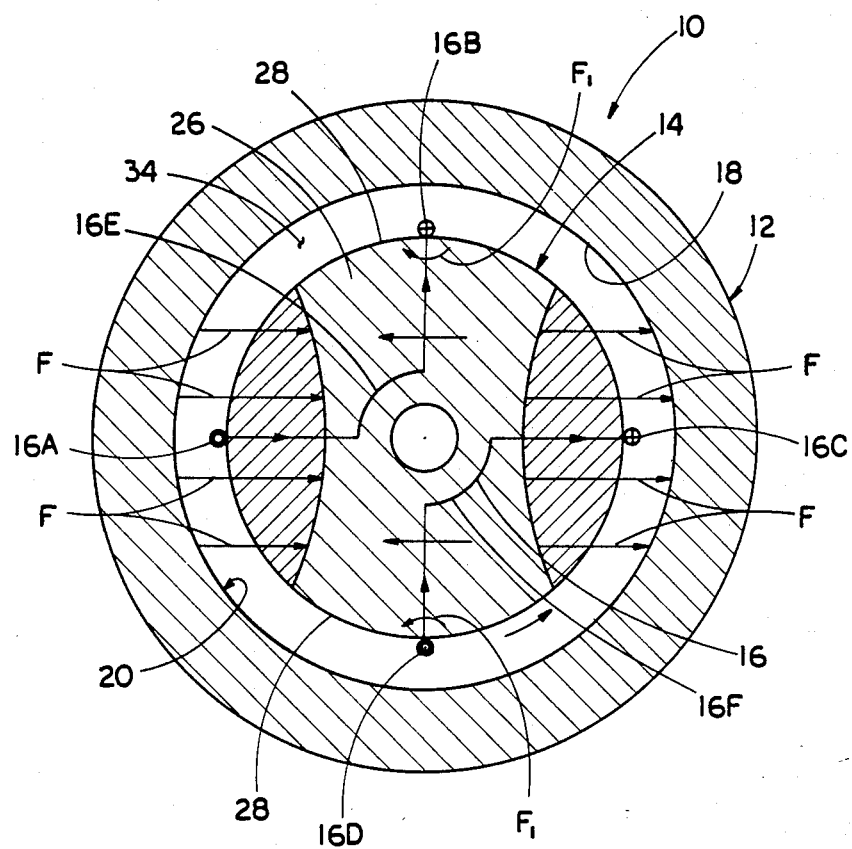

Referring now to the drawings, and particularly to FIGS. 1 to 3, there is shown a pulse power AC generator (FIGS. 2 and 3), generally indicated by the numeral 10, having a stationarily mounted elongated stator 12 (FIGS. 2 and 3), a rotatably mounted elongated rotor 14 and a winding 16 on the rotor 14, being constructed in accordance with the present invention.

Figure 4:
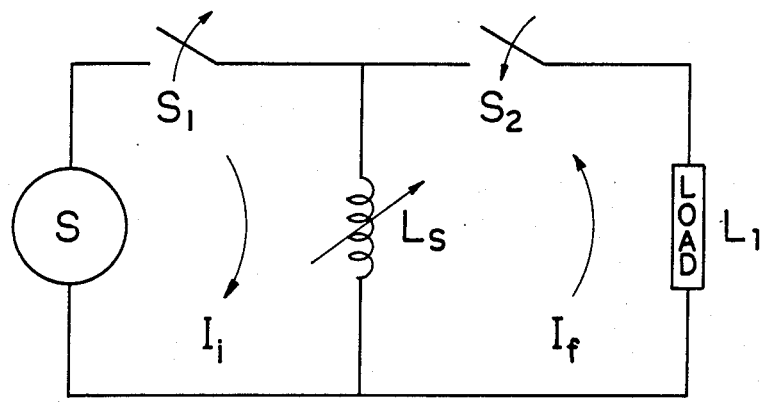
FIG. 4 is a schematic diagram of a simplified circuit providing an electrical analogy of the pulse power AC generator of FIGS. 2 and 3 being coupled to a load to which the energy stored by the generator during its charging phase of operation is released during its discharging phase of operation.
Figure 5:
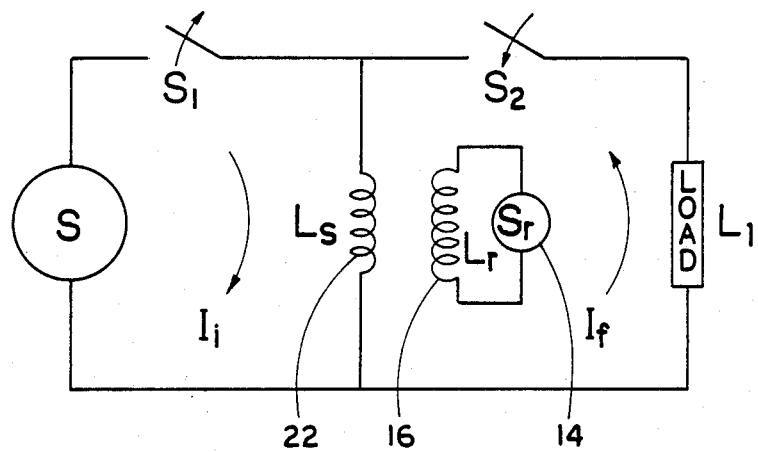
FIG. 5 is a schematic diagram of a circuit similar to that of FIG. 4 but also illustrating in an equivalent form the presence of the rotor winding.

More particularly, the stationary cylindrical stator 12 of the generator 10 has an interior annular cylindrical surface 18 defining a cylindrical bore 20. The stator 12 includes a stationary winding (being represented schematically by a coil 22 in FIGS. 4 and 5) connected to a power source (being represented by the current source S in FIGS. 4 and 5) for adapting the stator 12 to generate a magnetic flux, being represented by lines F in FIGS. 2 and 3, diametrically across a middle portion of its bore 20.

The rotor 14 of the generator 10 has a cylindrical core 26 with an exterior peripheral cylindrical surface 28 and a pair of first and second generally planar opposite end surfaces 30,32 (FIG. 1). The rotor core 26 extends through the stator bore 20 and is mounted for rotation relative to the stationary stator 12. Also, the rotor core 26 has an outside diameter smaller than that of the inside diameter of the stator 12 such that the exterior peripheral surface 28 of the core 26 is spaced inwardly from the stator interior surface 18 so as to define an annular gap 34 therebetween.

The winding 16 of the generator 10 is an electrical conductor extending along a closed loop path about the exterior peripheral surface 28 and first and second opposite end surfaces 30,32 of the rotor core 26. In extending along the closed loop path about the rotor core, the conductor 16 also extends within the annular gap 34 and, upon rotation of the rotor core 26, will cut the magnetic flux F generated by the stator 12.

More particularly, the conductor 16 includes at least four side conductor portions 16A–D having first and second opposite ends, and at least four end conductor portions 16E–H which interconnect the side conductor portions 16A–D to complete the closed loop path of the conductor. The side conductor portions 16A–D of the conductor 16 extend generally parallel to one another along generally linear portions of the closed loop path. They also are disposed along and angularly displaced generally ninety electrical degrees from one another about the exterior peripheral surface 28 of the rotor core 26.

A first pair of the end conductor portions 16E,16F of the conductor 16 are disposed at the first opposite ends of the side conductor portions 16A–D along the first end surface 30 of the rotor core 26. The end conductors 16E,16F of the first pair thereof interconnect respective adjacent pairs of the side conductor portions 16A,16B and 16C,16D. A second pair of the end conductor portions 16G,16H are disposed at the second opposite ends of the side conductor portions 16A–D along the second end surface 32 of the rotor core 26. The end conductors 16G,16H of the second pair thereof interconnect respective opposite pairs of the side conductor portions 16A,16C and 16B,16D. Therefore, the end conductor portions 16E,16F of the first pair thereof extend along respective non-crossing back-to-back generally ninety electrical degree portions of the closed loop path, whereas the end conductor portions 16G,16H of the second pair thereof extend along respective generally linear portions of the closed loop path which cross one another in a generally orthogonal relation.

For purposes of simplicity, FIG. 1 illustrates a single conductor version of the winding 16 on the rotor 14. However, it should be understood that the winding may have several conductors connected in series or parallel or a combination of both, depending upon the inductance and resistance requirements of the particular application or design. Mechanical strength and space requirements will also affect the design in any particular application.

As mentioned previously, the application of power to the main windings of the stator 12 establishes magnetic flux F across the air gap 34 between the stator 12 and rotor 14 at the middle portions thereof. FIGS. 2 and 3 illustrate the respective directions of current flow, as represented by the symbols on the side conductor portions 16A–D and the arrows on the end conductor portions 16E–H, as a result of voltages generated in the conductor 16 due to counterclockwise rotation the rotor 14 by a suitable independent prime mover (not shown) relative to the stator-produced magnetic flux 24. Also illustrated by curved arrows $F_1$ are the directions of respective magnetic flux generated about the side conductor portions 16A, 16C in FIG. 2 and 16B, 16D in FIG. 3 by the current flow in the conductor 16.

Referring first to FIG. 2, the following feedback process takes place during the charging phase of generator operation depicted therein. The current circulating in the rotor winding 16 produces the magnetic flux $F_1$ about the side conductor portions 16A, 16C (at the twelve and six o'clock positions of the conductor 16) that is in the same direction as the main stator flux F. By this means, the flux linking the main stator winding (22 in FIGS. 4 and 5) is increased from F to $F+F_1$. The increase in flux appears in the air gap 34 of the generator 10 and produces a higher current in the rotor winding 16. This flux buildup continues until the rotor 14 reaches the position where all of the axial or side conductor portions 16A–D of the rotor winding or conductor 16 are equidistant from the horizontal and vertical centerlines of the generator. At the latter position, the voltage generated in the winding becomes zero.

Referring now to FIG. 3, the following feedback process takes place during the discharging phase of generator operation depicted therein. As the rotor 14 continues to rotate from the equidistant position where voltage in the winding 16 became zero to the position shown in FIG. 3, the currents now flowing through the axial or side conductor portions 16B, 16D (now at the twelve and six o'clock positions of the conductor 16) are in reverse direction to the currents which flowed through side conductor portions 16A, 16C when they were at those positions in FIG. 2. Therefore, the current circulating in the rotor winding 16 produces the magnetic flux $F_1$ about the side conductor portions 16B, 16D (at the twelve and six o'clock positions of the conductor 16) that is in the opposite direction from the main stator flux F. By this means, the flux linking the main stator winding (22 in FIGS. 4 and 5) is decreased from F to $F-F_1$. Further rotation of the rotor 14 continues production of flux $F_1$ opposing the main stator flux F, but in ever decreasing amounts as the air gap flux is reduced.

As the rotor 14 continues to rotate until an angle of 180 electrical degrees from its initial position of FIG. 2 is established, the charging phase is repeated followed by repetition of the discharging phase. The greater the rate of rotation of the rotor, the higher the voltage generated and current induced in the conductor 16.

The production of pulse power by the generator 10 is fundamentally limited by the ratio of maximum to minimum inductance of the generator. This can best be explained in reference to FIGS. 4 and 5. Consider rotation of the rotor 14 as a current source $S_r$ shown in FIG.

5 which produces alternating current in the coil 16. In one direction of current flow through coil 16, the inductance $L_r$ will add to the inductance $L_s$ of the main stator coil 22, whereas in the opposite direction of current flow through the coil 16, inductance $L_r$ will be in opposition to inductance $L_s$. Thus, the rotor winding 16 increases the maximum inductance by providing a positive feedback path that aids and increases the flux linkages of the main stator winding 22 during the charging phase. The rotor winding 16 also minimizes the minimum inductance of the generator 10 by generating a flux that opposes and decreases the flux linkages of the main stator winding 22 during the discharge phase. The reduction of minimum inductance also allows the production of very short pulses. Since the rotor winding 16 requires no brushes or external connections, it allows repetitious production of pulses.

The goal is to have maximum inductance during the charging phase and minimum inductance during the discharging phase so as to have low source impedance and high current output when the energy is released to a load L. (By the constant flux linkage theorem which states that the flux linkages just prior to a transient must be equal to the flux linkages just after a transient, the final current $I_f$ is much larger than the initial current $I_i$ if the inductance during charging is maximum and during discharging is minimum.) In both circuits shown in FIGS. 4 and 5, at the start when the charging phase begins, the switch $S_2$ is closed and the switch $S_1$ is open. The effect of the rotor winding 16 is to maximize the inductance of $L_s$ as explained above as the main stator winding 22 is being charged by current source S.

Then, at the end of the charging phase the current source S is disconnected by opening the switch $S_2$. Now the effect of the rotor winding 16 in the discharging phase is to minimize the inductance of $L_s$ as explained above. With the switch $S_2$ opened, the load impedance $L_1$ is connected to the main stator winding 22 by closing the switch $S_1$. The final stored energy released to the load L can be much greater than the initial energy from the current source S because energy is also converted from the mechanical or kinetic energy of the rotor which is rotatably driven by an independent prime mover. Thus, the extra energy comes from rotor rotation.

It is thought that the present invention and many of its attendant advantages will be understood from the foregoing description and it will be apparent that various changes may be made in the form, construction and arrangement of the parts thereof without departing from the spirit and scope of the invention or sacrificing all of its material advantages, the form hereinbefore described being merely a preferred or exemplary embodiment thereof.

We claim:
1. A winding for use with a pulse AC generator rotor, comprising:
    (a) an electrical conductor extending along a closed loop path;
    (b) said conductor including at least four angularly-displaced side conductor portions having first and second opposite ends;
    (c) said conductor including at least four end conductor portions interconnecting said four side conductor portions to complete said closed loop path of said conductor;
    a first pair of said four end conductor portions being disposed at said first opposite ends of said four side conductor portions and interconnecting respective adjacent pairs of said four side conductor portions;
    (e) a second pair of said four end conductor portions being disposed at said second opposite ends of said four side conductor portions and interconnecting respective opposite pairs of said four side conductor portions.
2. The winding as recited in claim 1, wherein said four side conductor portions extend generally parallel to one another.
3. The winding as recited in claim 1, wherein said four side conductor portions are angularly displaced generally ninety electrical degrees from one another.
4. The winding as recited in claim 1, wherein said four side conductor portions are disposed along and angularly displaced from one another about a common imaginary cylindrical surface.
5. The winding as recited in claim 1, wherein said four side conductor portions extend along generally linear portions of said closed loop path.
6. The winding as recited in claim 1, wherein said first and second pairs of said four end conductor portions are disposed along respective oppositely-displaced parallelly-extending imaginary planar surfaces.
7. The winding as recited in claim 1, wherein said end conductor portions of said first pair thereof extend along respective non-crossing back-to-back generally ninety electrical degree portions of said closed loop path.
8. The winding as recited in claim 1, wherein said end conductor portions of said second pair thereof extend along respective generally linear portions of said closed loop path which cross one another in a generally orthogonal relation.

* * * * *